July 31 1951     L. E. YOUNG     2,562,347
SCREW HOLDING SCREW DRIVER
Filed Aug. 12, 1949
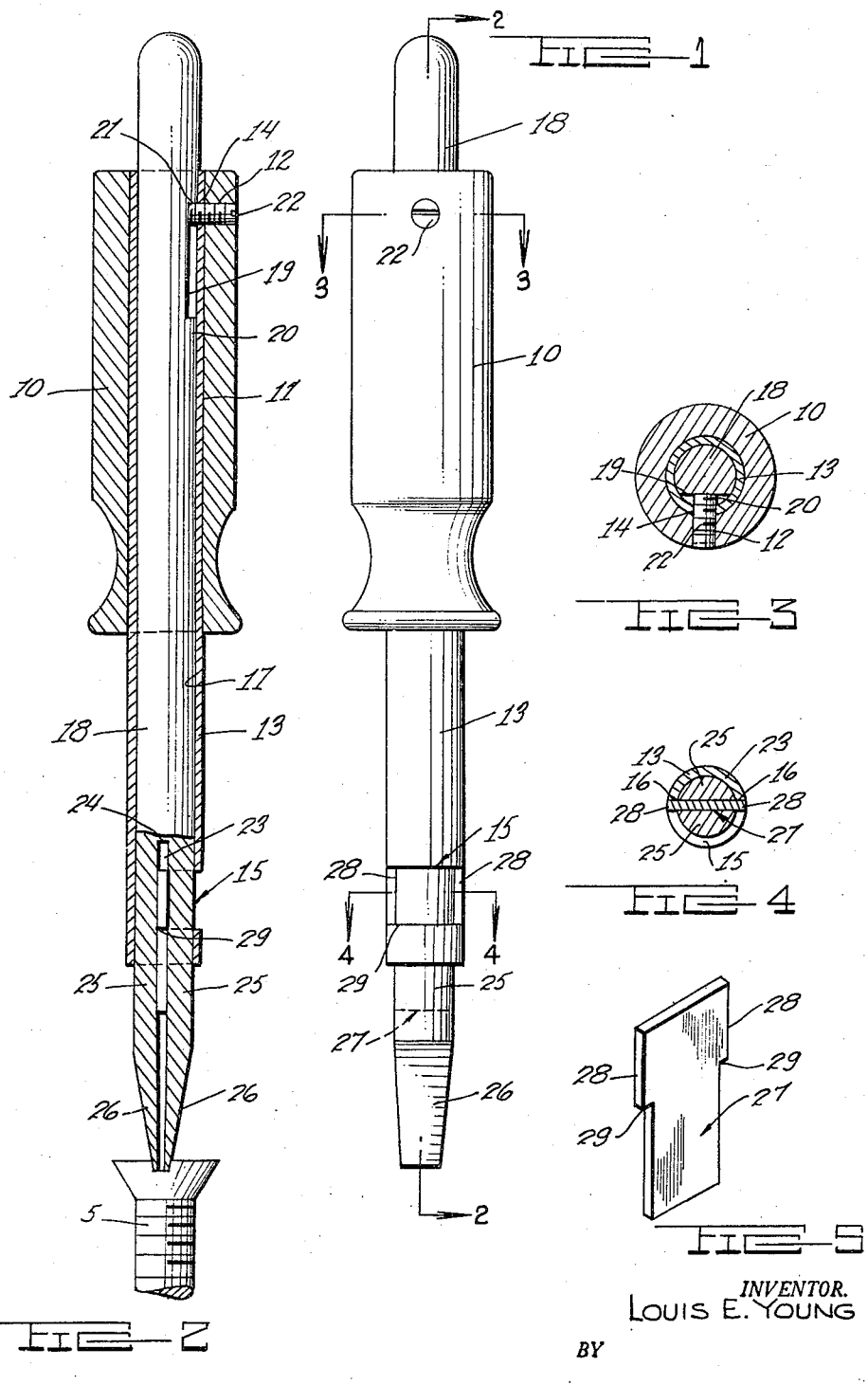
INVENTOR.
LOUIS E. YOUNG
BY
McMorrow, Berman + Davidson
ATTORNEYS Patented July 31, 1951

2,562,347

UNITED STATES PATENT OFFICE 2,562,347

SCREW HOLDING SCREW DRIVER

Louis E. Young, Waukegan, Ill.

Application August 12, 1949, Serial No. 109,849

3 Claims. (Cl. 145—50)

My invention relates to a screw holding screw driver.

An important object of the invention is to provide a screw driver having means for holding the screw while inserting same in a screw threaded opening, the screw driver being highly simplified, compact, extremely strong and cheap to manufacture.

Other objects and advantages of the invention will be apparent during the course of the following description.

In the accompanying drawings, forming a part of this application, and in which like numerals are employed to designate like parts throughout the same, Figure 1 is a side elevation of a screw holding screw driver embodying my invention, Figure 2 is a central vertical longitudinal section taken on line 2—2 of Figure 1, Figure 3 is a horizontal section taken on line 3—3 of Figure 1, Figure 4 is a similar section taken on line 4—4 of Figure 1, and, Figure 5 is a perspective view of a wedge plate.

In the drawings, wherein for the purpose of illustration is shown a preferred embodiment of my invention, the numeral 10 designates a generally cylindrical tubular handle which may be formed of metal, wood, or other suitable material and having a central longitudinal bore 11, and a screw threaded opening 12 near its outer end and formed in its side, and leading into the bore 11. Pressed into the handle 10 is a cylindrical tube 13, of steel or the like and having its outer end arranged flush with the outer end of the handle 10, as shown, and extending inwardly longitudinally beyond the inner end of the handle for a substantial distance. Near its outer end, tube 13 has a side opening 14 for registration with the screw threaded opening 12. Near its inner end, the tube 13 is provided in its side with a wide slot 15 extending partially inwardly through the wall of the tube and diametrically through tube 13 and forming diametrically oppositely arranged shoulders 16. The bore 17 of tube 13 slidably receives a straight cylindrical rod 18, preferably formed of tool steel. This rod 18 extends longitudinally through the tube 13 and beyond both ends of the tube, as shown, and is shiftable longitudinally of the tube in both directions. The rod 18 is provided in its side and near its outer end with a milled flat bottomed notch 19 having inner and outer ends 20 and 21. The notch 19 receives the nose of a set screw 22 mounted within the screw threaded opening 12 and extending through the opening 14 of the tube 13. The set screw 22 is slidable within the notch 19, and the ends 20 and 21 limit the relative longitudinal movement of the tube 13 with respect to the rod 18 in both directions. The flat bottomed notch 19 further co-acts with the set screw 22 to prevent the tube 13 and handle 10 from rotating with respect to the rod 18, while permitting them to be shifted longitudinally of the rod in both directions. The rod 18 is provided at its other end with a long central transverse narrow slot 23, the inner end 24 of which terminates at a point spaced from the open end of the slot 15, as shown. The slot 23 divides the inner end of the rod 18 into opposed screw driver blade sections 25, which are beveled on their outer sides and free ends as shown at 26 for forming the usual tapered screw driver blade construction. The slot 23 conformably and slidably receives the wedge plate 27 to be described hereinafter. The blade sections 25 are preferably pinched together and tempered after the slot 23 has been formed, so that the free ends 26 are normally biased inwardly toward each other for forming a narrow screw driver blade adapted to enter the usual slot in the head of the screw S to be driven.

Arranged between the opposed blade sections 25 and within the slot 23 of the rod 18, is a flat relatively thin wedge plate 27, having wings or extensions 28 on the sides of one end of the blade for engagement on the bounding walls or shoulders 16 of the slot 15. The width of the wedge plate 27, across the extensions 28, is the same as the outside diameter of the tube 13, Figure 4, and the extensions 28 form inner lateral shoulders 29 which engage upon the bottom or inner side of the groove 15, to support the wedge plate within the slot 23, Figures 1 and 2. The width of the wedge plate 27, inwardly of the slot 15, is the same as the diameter of the rod 18, and the wedge plate therefore extends entirely across the slot 23 and is as wide as the opposed blade sections 25, Figure 1. The inner end of the wedge plate 27 extends longitudinally inwardly beyond the inner end of the tube 13.

In use, the handle 10 and tube 13 are shifted to the outer end of the notch 19, and the parts are arranged as shown in Figure 2. The bottom of the slot 15 engages beneath the shoulders 29 and shifts the wedge plate 27 outwardly within the slot 23, to the position shown in Figure 2. With the parts thus arranged, the free ends of the opposed blade sections 25 are substantially contacting and the screw driver blade may readily be inserted into the slot in the head of screw S.

The handle 10 and tube 13 are now shifted longitudinally inwardly until the wedge plate 27 spreads the blade sections 25 apart sufficiently so that the blade sections will engage the sides of the slot in the screw and thereby firmly hold the screw. The wedge plate 27 is shifted longitudinally in either direction whenever the handle and tube are shifted with respect to the rod 18. The ends 20 and 21 limit the longitudinal movement of the handle and tube.

It is to be understood that the form of the invention herewith shown and described is to be taken as the preferred embodiment of my invention but that various changes in the shape, size and arrangement of parts may be resorted to without departing from the spirit of the invention or the scope of the subjoined claims.

Having thus described my invention, I claim:

1. A screw holding screw driver comprising a hollow tube, said tube having a transverse slot extending inwardly partially through the wall adjacent one end thereof, a flat wedge plate arranged longitudinally of and within said tube and supported upon the bounding walls of said slot, a rod supported within said tube for sliding longitudinal movement and having one end projecting from one end of said tube and having the other end projecting from the other end of said tube, said rod having a longitudinal slot extending transversely completely therethrough inwardly of said one end and terminating at a point spaced from said one end conformably and slidably receiving said wedge plate, said longitudinal slot forming in said one end of said rod a pair of opposed screw driver blade sections for insertion in the kerf of a screw and frictionally engageable with the adjacent walls of the kerf upon sliding movement of said tube toward said one end of said rod.

2. A screw holding screw driver comprising a hollow tube, said tube having a transverse slot extending inwardly partially through the wall adjacent one end thereof, a flat wedge plate arranged longitudinally of and within said tube and supported upon the bounding walls of said slot, a rod supported within said tube for sliding longitudinal movement and having one end projecting from one end of said tube and having the other end projecting from the other end of said tube, said rod having a longitudinal slot extending transversely completely therethrough inwardly of said one end and terminating at a point spaced from said one end conformably and slidably receiving said wedge plate, said longitudinal slot forming in said one end of said rod a pair of opposed screw driver blade sections for insertion in the kerf of a screw and frictionally engageable with the adjacent walls of the kerf upon sliding movement of said tube toward said one end of said rod, and means extending through said tube adjacent the other end thereof and slidably engageable with the adjacent portion of said rod for limiting the sliding longitudinal movement of the latter.

3. A screw holding screw driver comprising a hollow tube, said tube having a transverse slot extending inwardly partially through the wall adjacent one end thereof, and a flat wedge plate arranged longitudinally of and within said tube and supported upon the bounding walls of said slot by opposed wings on the sides thereof, a rod supported within said tube for sliding longitudinal movement and having one end projecting from one end of said tube and having the other end projecting from the other end of said tube, said rod having a longitudinal slot extending transversely completely therethrough inwardly of said one end and terminating at a point spaced from said one end comformably and slidably receiving said wedge plate, said longitudinal slot forming in said one end of said rod a pair of opposed screw driver blade sections for insertion in the kerf of a screw and frictionally engageable with the adjacent walls of the kerf upon sliding movement of said tube toward said one end of said rod.

LOUIS E. YOUNG.

REFERENCES CITED

The following references are of record in the file of this patent:

UNITED STATES PATENTS

| Number | Name | Date |
| --- | --- | --- |
| 766,270 | Lapham | Aug. 2, 1904 |
| 2,227,466 | Runge | Jan. 7, 1941 |

FOREIGN PATENTS

| Number | Country | Date |
| --- | --- | --- |
| 100,965 | Sweden | Feb. 25, 1941 |